(12) United States Patent
Ruck (10) Patent No.: US 10,788,303 B2
(45) Date of Patent: Sep. 29, 2020

(54) SENSOR ADJUSTMENT MECHANISM FOR A COORDINATE MEASURING MACHINE

(71) Applicant: Carl Zeiss Industrielle Messtechnik GmbH, Oberkochen (DE)

(72) Inventor: Otto Ruck, Ellwangen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 248 days.

(21) Appl. No.: 16/017,070

(22) Filed: Jun. 25, 2018

(65) Prior Publication Data
US 2019/0003813 A1  Jan. 3, 2019

(30) Foreign Application Priority Data

Jun. 29, 2017  (DE) .................. 10 2017 114 551

(51) Int. Cl.
*G01B 5/012* (2006.01)
*G01B 5/004* (2006.01)
*G01B 11/00* (2006.01)

(52) U.S. Cl.
CPC .......... *G01B 5/004* (2013.01); *G01B 5/012* (2013.01); *G01B 11/005* (2013.01)

(58) Field of Classification Search
CPC ........ G01B 5/004; G01B 5/008; G01B 5/012; G01B 5/016; G01B 7/004; G01B 7/008; G01B 7/012; G01B 7/016

(Continued)

(56) References Cited

U.S. PATENT DOCUMENTS 5,121,551 A * 6/1992 Linder .................. B25B 11/005
33/556
5,185,936 A * 2/1993 McMurtry ............. B23Q 16/08
33/1 D (Continued)

FOREIGN PATENT DOCUMENTS

DE  102005063242 A1  6/2007
DE  102007022326 A1  11/2008

(Continued)

OTHER PUBLICATIONS

English translation of German Patent Office Examination Report for German Appl'n No. 10 2017 114 551.6; Jun. 8, 2018; 8 pp.

*Primary Examiner* — Christopher W Fulton
(74) *Attorney, Agent, or Firm* — Harness, Dickey & Pierce, P.L.C.

(57) ABSTRACT

A sensor adjustment mechanism for a coordinate measuring machine includes a sensor, first and second joints, a change interface, and a fixing device. The first joint allows the sensor to pivot about a first axis. The second joint allows the sensor to rotate about a second axis. The change interface releasably couples the sensor adjustment mechanism to a measuring head of the coordinate measuring machine. The fixing device is configured to clamp the joints. The change interface includes a first component and a ferromagnetic second component movable relative to the first component. The change interface is configured to be fixed to the measuring head by a magnetic fixing force exerted on the second component, which causes a movement of the second component relative to the first component. The movement actuates the fixing device so as to clamp the joints and inhibit the sensor from being pivotable and rotatable.

16 Claims, 6 Drawing Sheets

(58) Field of Classification Search
USPC .................................... 33/556, 559, DIG. 1
See application file for complete search history.

(56) References Cited

U.S. PATENT DOCUMENTS

| | | | | |
|---|---|---|---|---|
| 5,404,649 | A * | 4/1995 | Hajdukiewicz | B23Q 5/58 33/503 |
| 5,848,477 | A * | 12/1998 | Wiedmann | G01B 5/012 33/503 |
| 5,918,378 | A * | 7/1999 | McMurtry | G01B 21/047 33/556 |
| 8,365,426 | B2 * | 2/2013 | Ruck | G01B 5/012 33/503 |
| 2004/0163268 | A1 | 8/2004 | McMurtry et al. | |
| 2005/0256672 | A1 | 11/2005 | McMurtry et al. | |
| 2008/0134486 | A1 * | 6/2008 | Enderle | G01B 21/047 29/33 R |
| 2009/0025243 | A1 * | 1/2009 | Prestidge | G01B 5/012 33/559 |
| 2014/0259715 | A1 * | 9/2014 | Engel | G01B 7/008 33/503 |
| 2017/0370690 | A1 * | 12/2017 | Held | G01B 21/042 |

FOREIGN PATENT DOCUMENTS

| | | |
|---|---|---|
| DE | 102009048581 B3 | 6/2011 |
| EP | 0790478 A2 | 8/1997 |

\* cited by examiner

SENSOR ADJUSTMENT MECHANISM FOR A COORDINATE MEASURING MACHINE

CROSS REFERENCES TO RELATED APPLICATIONS

This application claims priority from German patent application DE 10 2017 114 551.6, filed on Jun. 29, 2017. The entire content of this priority application is incorporated herein by reference.

BACKGROUND OF THE INVENTION

The present disclosure relates to a sensor adjustment mechanism for a coordinate measuring machine, wherein the sensor adjustment mechanism enables a readjustment or reorientation of a sensor of the coordinate measuring machine.

The present disclosure furthermore relates to a coordinate measuring machine for determining spatial coordinates on a measurement object, comprising a measuring head, a frame structure, which is configured to move the measuring head relative to the measurement object, and a sensor adjustment mechanism of the abovementioned type, which is releasably attached to the measuring head.

A coordinate measuring machine having a sensor adjustment mechanism is known from EP 0 790 478 A2 and US 2005/0256672 A1, for example.

Coordinate measuring machines are used to check workpieces, for example as part of quality assurance, or to determine the geometry of a workpiece completely as part of what is known as "reverse engineering". Moreover, multifarious further application possibilities are conceivable.

In such coordinate measuring machines, different kinds of sensors may be used to capture the coordinates of a workpiece to be measured. In the case of the sensors, a fundamental distinction is drawn between sensors that operate in a contactless way, which include optical sensors, for example, and sensors which operate by contact. Among sensors operating by contact are sensors which make tactile measurements, for example, as sold by the applicant under the product name "VAST". Here, the surface of the workpiece to be measured is scanned with a stylus, the coordinates of which in the measurement space are known at all times. Such a stylus may also be moved along the surface of a workpiece, such that a multiplicity of measurement points may be captured at set time intervals during such a measuring process within the scope of what is known as a "scanning method".

The styluses can be actively changed during a measuring process. Such a changeover of the styluses is necessary particularly in the case of large and complex workpieces, e.g. engine blocks or cylinder heads, since different stylus configurations are required for the complete measurement. Normally, a multiplicity of different styluses is held ready in a magazine, which can be approached automatically by the machine. These various styluses or stylus configurations can be coupled to the measuring head by means of a change interface, which is standardized. However, the required space in the magazine for depositing or storing various styluses is often a limiting factor, quite apart from the costs occasioned by this large number of styluses.

It is therefore desirable to be able to perform as many measurement tasks as possible with one and the same stylus. To achieve this, however, it is necessary to reorient the stylus or the respective sensor. Sensor adjustment mechanisms which can be coupled to the measuring head of the coordinate measuring machine together with the stylus allow such reorientation.

A stylus with a sensor adjustment mechanism is described in EP 0 790 478 A2, wherein the orientation of the stylus can be changed by means of self-centering stylus contact. The newly set orientation or stylus direction is effected by means of a clamping device, which is activated by corresponding electric activation.

In US 2005/0256672 A1, there is a description of a sensor adjustment mechanism which can change the direction of a probe head or stylus by using a rotation and pivoting device which is spaced apart from the tip of the stylus.

In both systems described, the fixing of the end position is produced by an additional device with a dedicated control (electric or by means of the machine control system of the coordinate measuring machine). A dedicated control is likewise required to release the fixing.

Another sensor adjustment mechanism is known from DE 10 2007 022 326 A1, which has a transmission to enable the stylus to be adjusted relative to the measuring head with the aid of an external torque.

The three examples mentioned all relate to passive sensor adjustment mechanisms, in which the stylus or sensor cannot be rotated or pivoted actively, in contrast to an active sensor adjustment mechanism. Instead, a stop, e.g. in the form of a sphere triplet or roller triplet, is required for the adjustment of the stylus alignment. This stop must be arranged within the measurement volume available to enable it to be approached by the coordinate measuring machine.

The present disclosure likewise preferably relates to a passive sensor adjustment mechanism of this kind.

SUMMARY OF THE INVENTION

It is an object to provide an alternative sensor adjustment mechanism in which, in particular, the fixing and unfixing of the stylus orientation required for the reorientation of the stylus is possible in a simpler way than previously.

According to a first aspect of the present disclosure, a sensor adjustment mechanism for a coordinate measuring machine is presented, wherein the sensor adjustment mechanism comprises: a sensor, a first joint which is designed as a pivot joint by means of which the sensor is pivotable about a first axis, a second joint which is designed as a rotary joint by means of which the sensor is rotatable about a second axis different from the first axis, a change interface for releasably coupling the sensor adjustment mechanism to a measuring head of the coordinate measuring machine, and a fixing device which is configured to clamp the first and the second joint. The change interface comprises a first component and a ferromagnetic second component, which is movably mounted so as to be movable relative to the first component. The change interface is configured to be fixed to the measuring head of the coordinate measuring machine by means of a magnetic fixing force exerted on the second component. Said magnetic fixing force exerted on the second component causes a movement of the second component relative to the first component, wherein said movement actuates the fixing device so as to clamp the first and the second joint and inhibit the sensor from being pivotable about the first axis and from being rotatable about the second axis.

According to a second aspect of the present disclosure, a sensor adjustment mechanism for a coordinate measuring machine is presented, wherein the sensor adjustment mechanism comprises: a sensor, at least one joint by means of which the sensor is pivotable and/or rotatable, a change interface for releasably coupling the sensor adjustment mechanism to a measuring head of the coordinate measuring machine, and a fixing device which is configured to clamp the least one joint. The change interface comprises a first component and a ferromagnetic second component, which is movably mounted so as to be movable relative to the first component. The fixing device comprises a third component, which is connected to the second component via a coupling mechanism. The change interface is configured to be fixed to the measuring head of the coordinate measuring machine by means of a magnetic fixing force exerted on the second component. Said magnetic fixing force exerted on the second component causes a movement of the second component relative to the first component, wherein said movement deforms the third component and thereby actuates the fixing device so as to clamp the at least one joint and inhibit the sensor from being pivotable and/or rotatable.

According to further aspects of the present disclosure, coordinate measuring machines having one of the aforementioned sensor adjustment mechanism are presented.

The herein presented sensor adjustment mechanism makes use of the force which is normally exerted on the sensor adjustment mechanism by a magnet arranged on the measuring head in order to fix said mechanism on the measuring head. This magnetic fixing force is also used to actuate the fixing device of the sensor adjustment mechanism. By fixing the sensor adjustment mechanism on the measuring head, therefore, the fixing device is simultaneously actuated, thereby inhibiting or blocking the rotatability or pivotability of the sensor (e.g. of the probe head). For this purpose, the change interface comprises two components that can be moved relative to one another, which, in the present case, are designated as the first and the second component, which preferably both comprise a ferromagnetic material.

As a counterpart, two magnets are usually used on the measuring head, a first magnet for producing a magnetic coupling force for coupling the sensor adjustment mechanism to the measuring head and a second magnet for producing the magnetic fixing force for fixing the sensor adjustment mechanism on the measuring head. The fixing force produced by the second magnet is generally greater than the coupling force produced by the first magnet. It is therefore possible to couple the sensor adjustment mechanism with the aid of the first magnet and to finally fix it with the aid of the second magnet.

The sensor adjustment mechanism is configured in such a way that the first magnet, which is arranged on the measuring head, can couple to the first component of the sensor adjustment mechanism and attracts said component through the magnetic coupling force. The coupling force should be at least sufficient to be able to hold the sensor adjustment mechanism, together with the sensor, on the measuring head against the weight of said mechanism and sensor. The first magnet is therefore generally designed as a permanent magnet. The second magnet, which, in contrast, is generally designed as an electromagnet, couples to the second component of the sensor adjustment mechanism, which is supported in such a way as to be movable relative to the first component. As soon as the second magnet is activated, therefore, the significantly greater fixing force is exerted on the second component of the sensor adjustment mechanism. As a result, this second component is moved relative to the first component. Coupled with this movement, the fixing device is actuated, the sensor thus being fixed in its orientation.

During a measurement task, the following illustrative sequence is possible with the sensor adjustment mechanism: First of all, the sensor adjustment mechanism, together with the sensor arranged thereon, is coupled to the measuring head with the aid of the first magnet. Until the second magnet (electromagnet) has been activated, the sensor can be rotated or pivoted freely around the first joint. Thus, the orientation of the sensor can be adjusted in a freely selectable manner. This can be accomplished, for example, by automatically driving the machine to a cylinder triple or sphere triple and then moving the measuring head. As soon as the desired sensor orientation has been set, the second magnet, which is situated on the measuring head, is activated, with the result that the sensor adjustment mechanism is finally fixed on the measuring head and, at the same time, the rotatability or pivotability of the sensor is inhibited or blocked. The workpiece can then be probed in the sensor orientation set. To set a new sensor orientation, the second magnet is deactivated again, thereby releasing the fixing device again and allowing the sensor to be freely rotated or pivoted again. A new orientation can then be set in the manner just described.

In a refinement, the second magnet is activated in pulsed mode, i.e. in order to fix the sensor adjustment mechanism, the electromagnet (second magnet) is briefly activated. A small air gap between the second magnet and the second component of the sensor adjustment mechanism is thereby closed. After this, the electromagnet is switched off since the permanent magnet now has a much higher force of attraction through the absence of the air gap than with the air gap. To unlock, the permanent magnet is neutralized briefly by the electromagnet, as a result of which an air gap forms again between the second magnet and the second component of the sensor adjustment mechanism, and the force of attraction decreases again significantly as a consequence.

There are therefore two different modes of activation for the second magnet. Either the electromagnet in the second magnet is activated for the purpose of fixing and then remains activated until the sensor adjustment mechanism is to be changed and is then deactivated. Or (preferred mode) there is only pulsed activation of the electromagnet during coupling and decoupling (with opposite polarization). Such pulsed activation of the electromagnet is advantageous since it generates very much less heat than continuous activation. Reduced heat generation is highly advantageous in terms of measurement.

As compared with the above mentioned systems from the prior art, the herein presented sensor adjustment mechanism has the advantage that no additional device or additional electric activation is required to lock and release the fixing device since this can take place simultaneously with the fixing of the sensor adjustment mechanism on the measuring head, said fixing being the usual practice in any case. This has the effect of significantly reducing complexity, thereby making it possible to achieve not only a cost saving but also greater flexibility of the overall system. Moreover, a sensor, whether it is an optical sensor or a tactile sensor, can be repositioned relatively simply and quickly, which in turn allows a time saving in the measurement procedure.

Since the above-described construction with two magnets on the measuring head is thoroughly conventional, the measuring head itself does not have to be adapted, and therefore the sensor adjustment mechanism can be coupled without problems to a standardized measuring head, e.g. a VAST measuring head.

According to a refinement, the sensor adjustment mechanism furthermore comprises a second joint, wherein the first joint is a pivot joint and the second joint is a rotary joint, and wherein the fixing device is configured to firmly clamp both the first joint and the second joint in order to block the rotatability or pivotability of the sensor.

This has the advantage that the sensor adjustment mechanism can be fixed on the measuring head in one and the same operation and, at the same time, both joints of the sensor adjustment mechanism are locked. Accordingly, the fixing device is also configured to release both joints simultaneously as the fixing device is released. The first joint is preferably pivotable about a pivoting axis which is aligned perpendicularly to the axis of rotation about which the second joint can be rotated. It is self-evident that it is, of course, also possible for more than two joints to be provided on the sensor adjustment mechanism.

According to embodiment further refinement, the fixing device also comprises a third component in addition to the first two components, said third component being connected to the second component via a coupling mechanism and being deformed by the movement of the second component.

The sensor is preferably connected to the third component via the first joint. The third component, in turn, is connected to the first two components via the coupling mechanism. Thus, the sensor adjustment mechanism can be constructed from a relatively small number of components.

In a further refinement, the sensor adjustment mechanism is preferably a unit consisting of purely mechanical components. This proves to be economical and, at the same time, little prone to faults.

In a refinement, the first joint is arranged between two flanks of the third component, wherein the first joint is clamped between the third component during a deformation of the third component caused by the movement of the second component. The inhibition or blocking of the pivotability of the sensor can thus be accomplished in a relatively simple mechanical way.

The second joint is likewise firmly clamped by the movement of the second component. This is preferably accomplished by virtue of the fact that the third component is pressed against the first component by means of the coupling mechanism and, as a result, frictional engagement, by which the second joint is locked, arises between the two components.

In a refinement, the coupling mechanism comprises a spring-loaded pin. In addition, this spring-loaded pin preferably comprises a nut, with the aid of which the preload of the spring surrounding the pin can be adjusted.

In a refinement, the first component at least partially surrounds the second component. As a particular preference, the first component completely surrounds the second component. The first component is preferably designed as a plate-shaped or circular-ring-shaped disk, on the upper side of which at least three supports are arranged. In practice, this first component is often referred to as a disk. In contrast, the second component is often referred to in practice as an armature disk. This is preferably a circular disk, which is arranged in the recess of the first component (disk) in the form of a circular ring.

The sensor is preferably a stylus and/or an optical sensor.

As likewise already mentioned at the outset, the present disclosure relates not only to the sensor adjustment mechanism itself but also to a coordinate measuring machine in which a sensor adjustment mechanism of this kind is used. A coordinate measuring machine of this kind preferably comprises a measuring head, a frame structure, which is configured to move the measuring head relative to the measurement object, and said sensor adjustment mechanism, which can be coupled releasably to the measuring head and on which the sensor (optical or tactile sensor) is arranged.

It goes without saying that the aforementioned refinements and the features defined in the claims relate not only to the sensor adjustment mechanism itself, but also to the claimed coordinate measuring machine with such a sensor adjustment mechanism. It also goes without saying that the aforementioned features and those yet to be explained below can be used not only in the combination specified in each case but also in other combinations or on their own, without departing from the spirit and scope of the present disclosure.

PREFERRED EMBODIMENTS OF THE INVENTION

Figure 1:
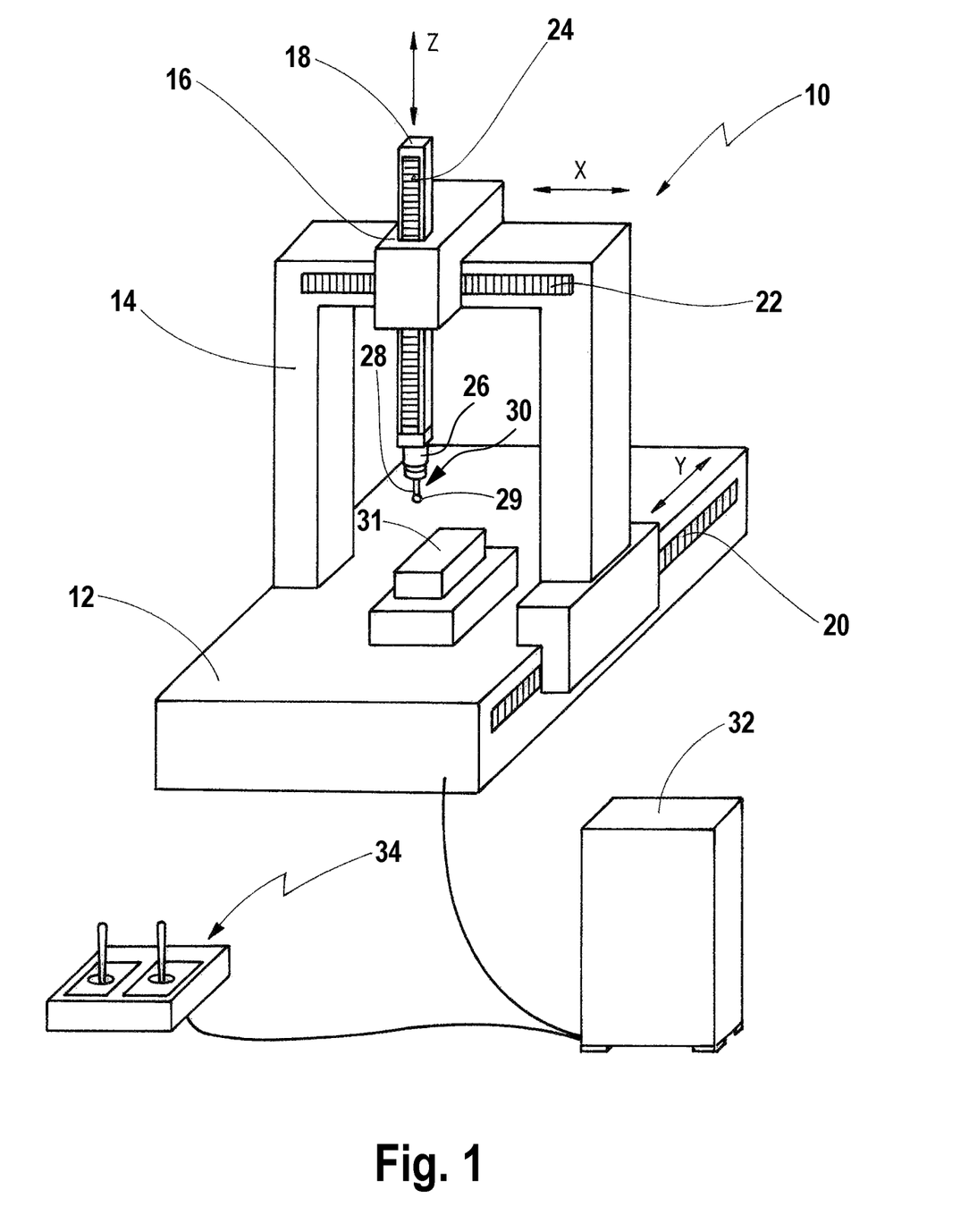
FIG. 1 shows a coordinate measuring machine according to an exemplary embodiment.

FIG. 1 shows an exemplary embodiment of a coordinate measuring machine in which the herein presented sensor adjustment mechanism can be used. The coordinate measuring machine is designated as a whole by the reference numeral 10 therein.

The coordinate measuring machine 10 comprises in the exemplary embodiment shown in FIG. 1 a base 12, on which a portal 14 is arranged displaceably in the longitudinal direction. The base 12 is preferably a stable disk, which is for example produced from granite. The portal 14 serves as a movable supporting structure for the measuring head 26. It comprises two columns and a crossbeam arranged transversely thereto, on the columns.

The direction of movement of the portal 14 in relation to the base 12 is usually referred to as the Y axis. Arranged on the upper crossbeam of the portal 14 is a carriage 16, which is displaceable in the transverse direction. This transverse direction is usually referred to as the X axis. The carriage 16 carries a quill 18, which can be made to move in the Z direction, that is to say perpendicularly in relation to the base 12.

Measuring devices by means of which the position of the portal 14, the carriage 16 and the quill 18 can be determined are denoted by the reference numerals 20, 22 and 24. The measuring devices 20, 22 and 24 are typically glass rulers, which serve as measuring scales. These measuring scales are formed in conjunction with corresponding reading heads (not shown here) to determine the respectively current position of the portal 14 in relation to the base 12, the position of the carriage 16 in relation to the upper crossbeam of the portal 14 and the position of the quill 18 in relation to the carriage 16.

The measuring head 26, which is often also referred to as a probe head, is arranged at the lower, free end of the quill 18. A sensor or measuring tool 28 can be detachably coupled to the measuring head 26. The sensor 28 is part of a sensor adjustment mechanism 30, with the aid of which the spatial orientation of the sensor 28 can be changed. The rotating-pivoting mechanism 30 comprises at least one joint, with the aid of which the sensor 28 can be rotated and/or pivoted about one, two or more axes.

In the present case, the component on which the sensor 28 is arranged and which contains the mechanism for rotating and/or pivoting the sensor 28 is referred to as the sensor adjustment mechanism 30. It is therefore the entire component (together with the sensor 28) that can be coupled to the measuring head 26 which is referred to as the sensor adjustment mechanism 30.

In the embodiment shown in FIG. 1, the sensor 28 comprises a tactile stylus, on the free end of which a probe ball 29 is arranged. This probe ball 29 serves the purpose of probing a measuring point on a measurement object 31. With the aid of the measuring devices 20, 22, 24, the position of the measuring head 26 within the measuring volume when probing a measuring point can be determined. The current rotational and pivoting position of the stylus 28, and consequently the position of the probe ball 29 in relation to the measuring head 26, can be determined by way of a suitable sensor system, which is arranged in the measuring head 26. The items of positional information mentioned are fed to a control unit 32, which then determines the current spatial coordinates of the respective measuring point on the workpiece 31 to be measured.

Since the measuring sensor system for determining the spatial orientation of the stylus 28 in relation to the quill 18 is arranged in the measuring head 26, the corresponding component, which is connected in a fixed manner to the lower end of the quill 18, is referred to in the present case as the measuring head 26. This may be for example a measuring head from the VAST product range sold by the Applicant. However, it should be noted that, in some cases, it is not only the component 26 to which the sensor adjustment mechanism 30 can be coupled which is referred to as the measuring head. Instead, the designation "measuring head" is also often used for components 26 and 30 taken together.

As already mentioned, the evaluation and control unit 32 serves on the one hand for reading in the measured values from the measuring devices 20, 22, 24 and the measuring head 26 and for determining in dependence on these values the spatial coordinates of a measuring point. On the other hand, the evaluation and control unit 32 serves the purpose of activating the motorized drives for the movement of the measuring head 26 and the rotating-pivoting mechanism 30 arranged on it, together with the stylus 28, along the three coordinate axes X, Y and Z.

The reference numeral 34 denotes an operating console, which may be optionally provided, in order to manually move the measuring head 26 with the rotating-pivoting mechanism 30 that is arranged on it.

It should be noted that, instead of a tactile sensor 28 shown here, it is also possible to use an optical sensor, e.g. a high-resolution camera. It should furthermore be noted that the presented exemplary embodiment is explained only by way of example on the basis of a coordinate measuring machine 10 of portal design. In principle, however, the herein presented sensor adjustment mechanism 30 can also be used in coordinate measuring machines of cantilever arm, bridge or stand design. Depending on the type of construction of the coordinate measuring machine 10, the relative movement of the base 12 and the sensor 28 along one, two or all three spatial directions can also be achieved by the base or a workpiece holder 12 being able to move.

Figure 2:
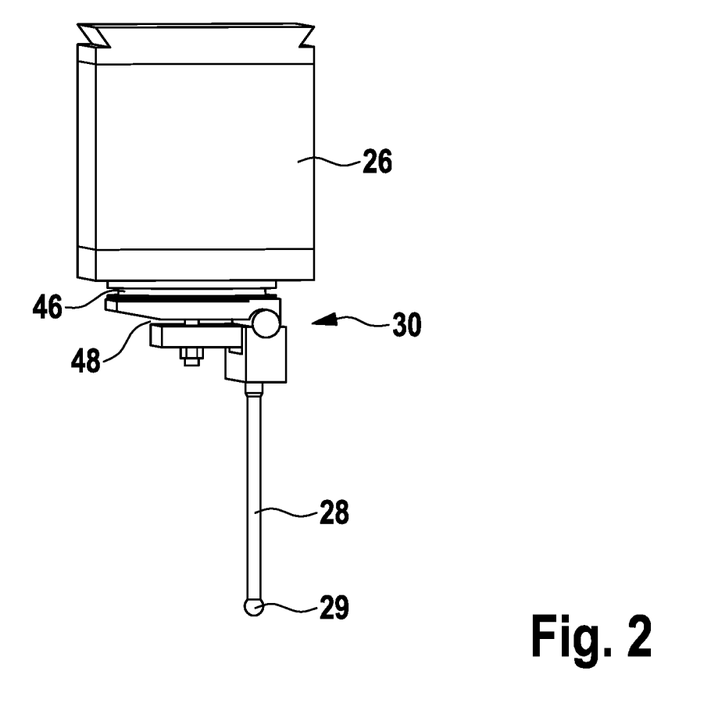
FIG. 2 shows a detail view of a measuring head of a coordinate measuring machine with a sensor adjustment mechanism according to an exemplary embodiment.

FIG. 2 shows a detail view of an exemplary embodiment of the measuring equipment comprising the measuring head 26, the sensor adjustment mechanism 30 and the sensor or stylus 28 arranged thereon. The measuring head 26 comprises a standardized interface, with the aid of which the sensor adjustment mechanism 30 can be coupled and fixed to the measuring head 26. Both the coupling and fixing of the sensor adjustment mechanism is accomplished by means of magnetic forces.

In the present case, a distinction is drawn between the coupling and the fixing of the sensor adjustment mechanism 30. Coupling is understood to mean the procedure in which the sensor adjustment mechanism 30 is coupled temporarily to the measuring head 26. The measuring head 26 and the sensor adjustment mechanism 30 are connected to one another after this. However, the coupling force which holds the two parts 26, 30 against one another is not yet sufficient to enable probing actions to be performed with the sensor 28. For this purpose, the sensor adjustment mechanism 30 is then fixed on the measuring head 26 with the aid of an additionally applied fixing force.

Figure 3:
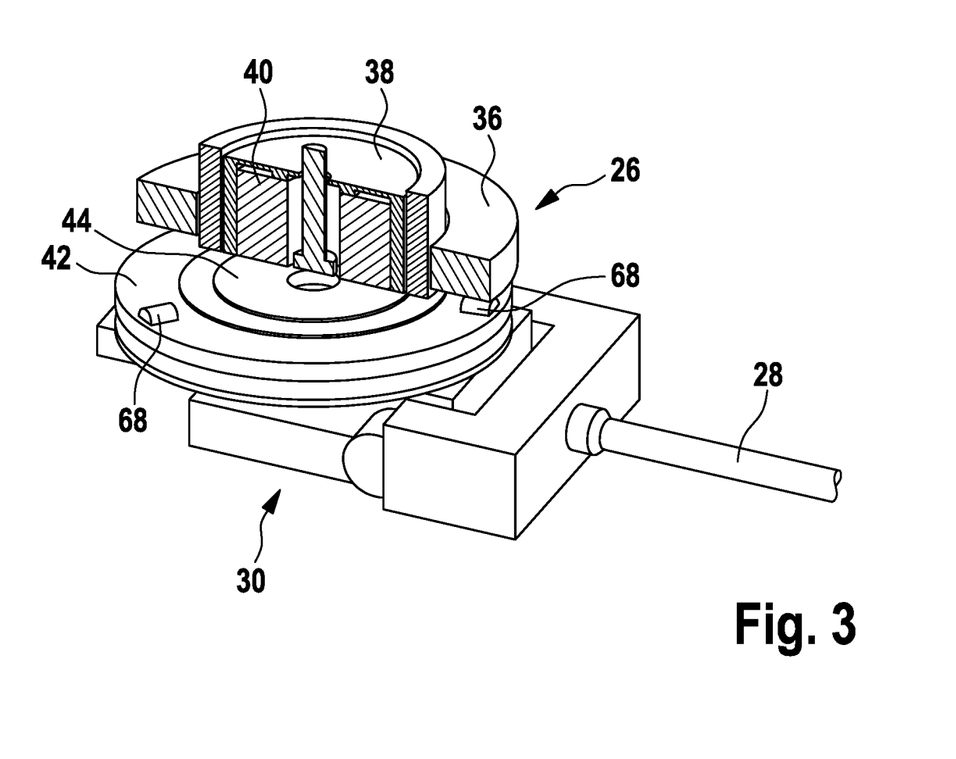
FIG. 3 shows parts of the measuring head together with the sensor adjustment mechanism shown in FIG. 2, wherein the parts of the measuring head are depicted in half section.

The pure coupling operation, i.e. the application of the coupling force, is typically performed by means of a first magnet 36, which is mounted on the measuring head and which can be seen, for example, in FIG. 3. This first magnet 36 is preferably designed as a permanent magnet. A further magnet, which is arranged on the measuring head 26 and, in the present case, is referred to as the second magnet 38, is provided to generate the fixing force. This second magnet 38 preferably comprises an electromagnet, which can be separately activated. As a particular preference, the second magnet 38 is a combination of a permanent magnet and an electromagnet. In order to fix the sensor adjustment mechanism 30, the electromagnet of the second magnet 38 is briefly activated. Energizing the coil associated with the second magnet 38 generates the fixing force necessary to fix the sensor adjustment mechanism 30. A small air gap between the second magnet 38 and the second component 44 of the sensor adjustment mechanism 30 is thereby closed. After this, the electromagnet of the second magnet 38 is switched off since the permanent magnet of the second magnet 38 now has a much higher force of attraction through the absence of the air gap than with the air gap. To unlock or change the sensor adjustment mechanism 30 and the sensor 28 arranged thereon, the permanent magnet of the second magnet 38 is neutralized briefly by the electromagnet, as a result of which an air gap forms again between the second magnet 38 and the second component 44 of the sensor adjustment mechanism 30, and the force of attraction decreases again significantly as a consequence. According to this mode of activation of the second magnet 38, the electromagnet has the reverse polarity during decoupling to that during coupling.

Figure 4:
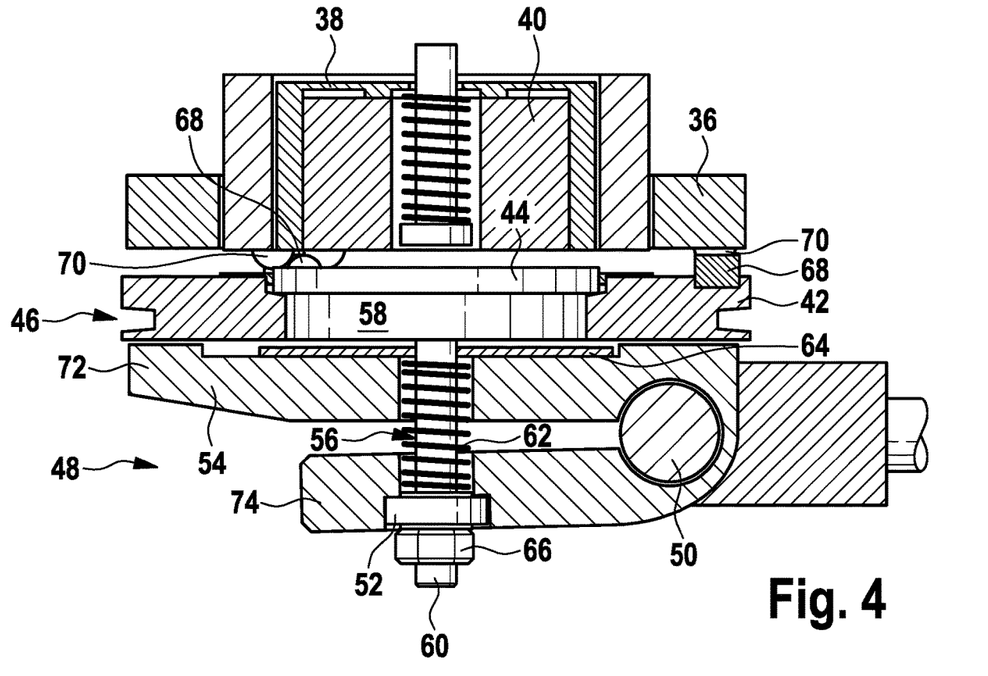
FIG. 4 shows a section through the exemplary embodiment of the measuring head and the sensor adjustment mechanism depicted in FIGS. 2 and 3 in a first position.
Figure 5:
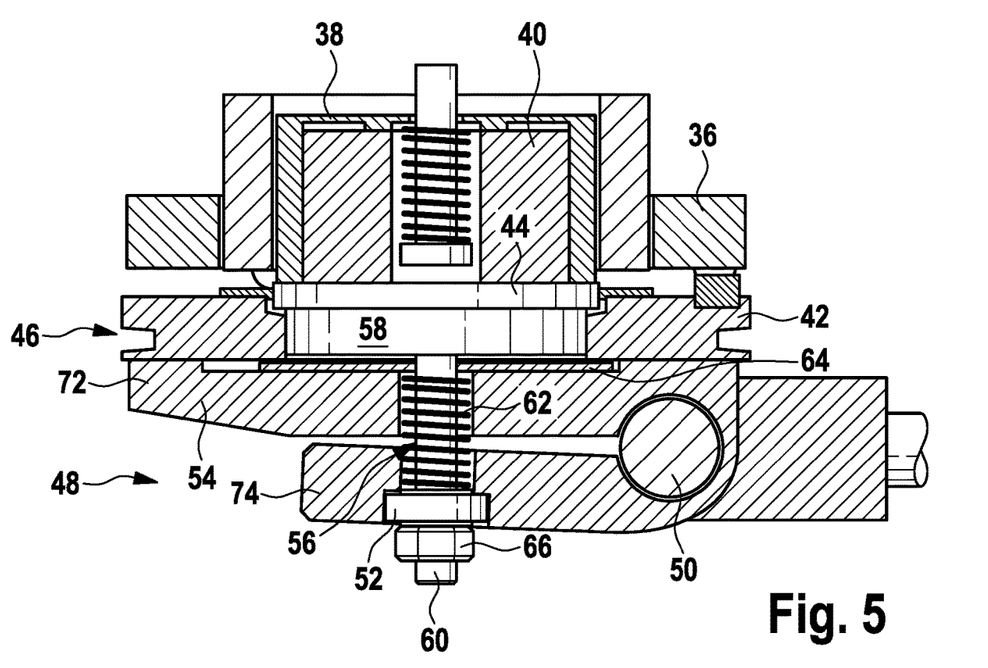
FIG. 5 shows a section through the exemplary embodiment of the measuring head and the sensor adjustment mechanism shown in FIGS. 2 and 3 in a second position.
Figure 6A:
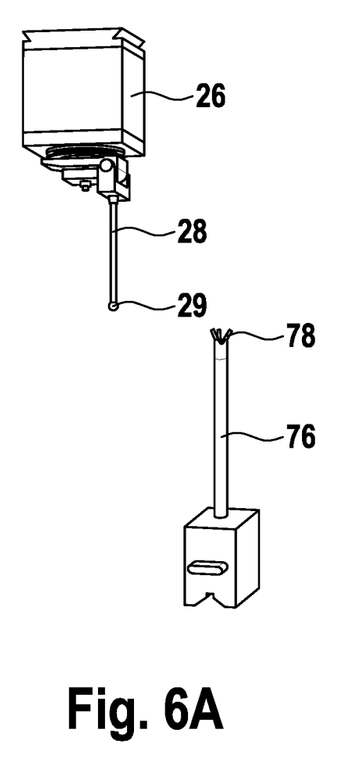
FIGS. 6A-6F show an illustration of a procedure for repositioning a sensor secured on the sensor adjustment mechanism.
Figure 6B:
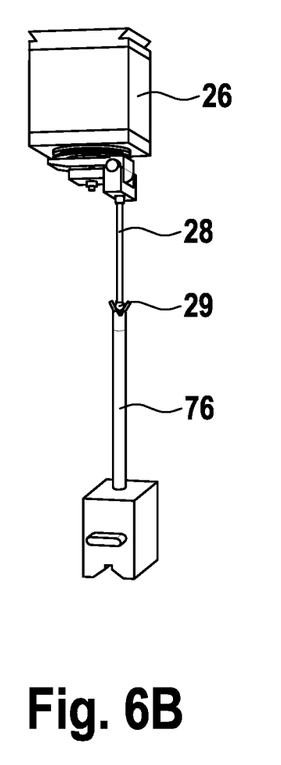
Figure 6C:
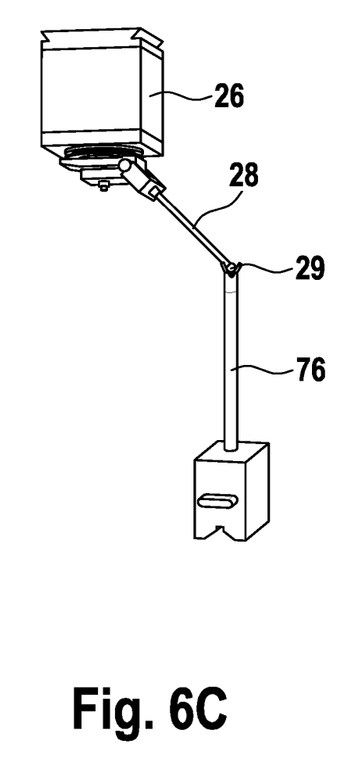
Figure 6D:
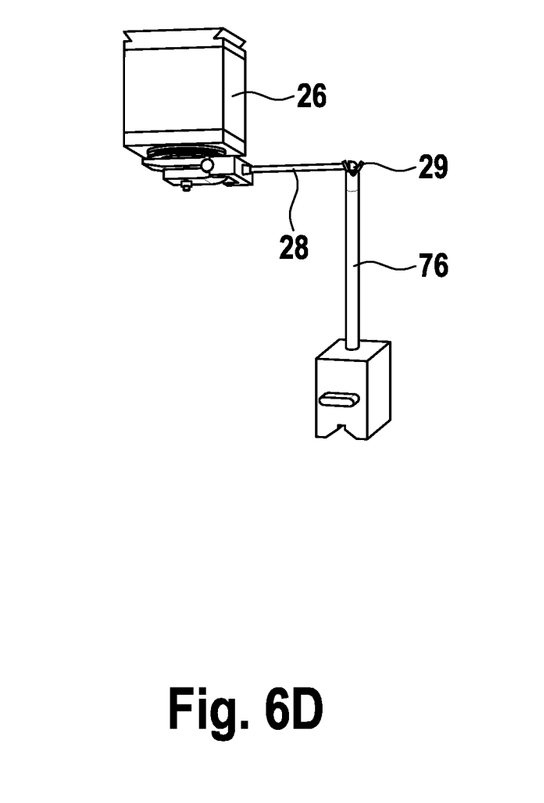
Figure 6E:
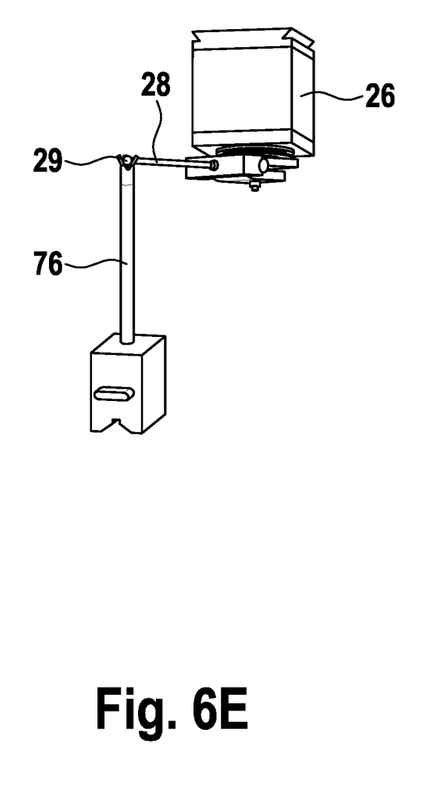
Figure 6F:
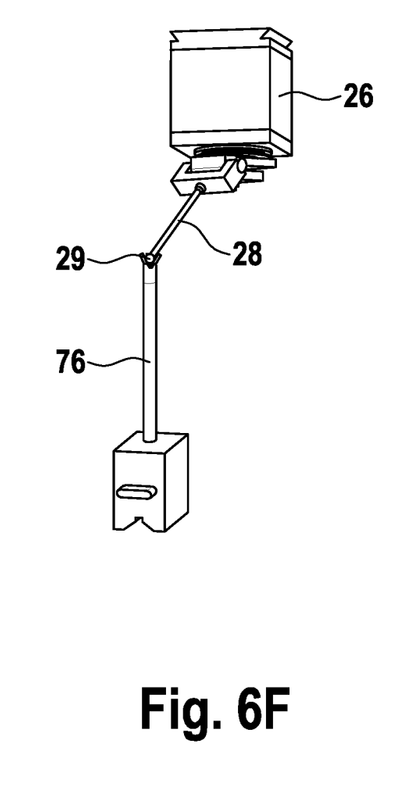

As can be seen especially from FIGS. 3-5, the sensor adjustment mechanism 30 according to the exemplary embodiment shown in the present case comprises a plurality of components that can be moved relative to one another. A first component 42, which in practice is usually referred to as a disk, and a second component 44, which in practice is often referred to as an armature disk, form parts of the change interface 46, with the aid of which the sensor adjustment mechanism 30 is releasably coupled to the measuring head 26. Both components 42, 44 preferably comprise a ferromagnetic material to enable them to be attracted by the magnets 36, 38. The first component 42, i.e. the disk, forms the counterpart to the first magnet 36. The second component 44, i.e. the armature disk, forms the counterpart to the second magnet 38.

A fixing device 48 is provided on the sensor adjustment mechanism 30, below the change interface 46. This fixing device 48 is required either to block or release the rotatability or pivotability of the sensor 28, which is ensured by means of two joints 50, 52 in the exemplary embodiment under consideration. Release of the rotatability or pivotability of the sensor 28 takes place, in particular, upon reorientation of the sensor 28. Blocking of the rotatability or pivotability of the sensor 28, in contrast, takes place as soon as the sensor 28 has been set to the desired orientation and a measurement process is initiated.

In the exemplary embodiment under consideration, the first joint 50 is designed as a pivot joint, with the aid of which the sensor 28 can be pivoted about a first axis. In the exemplary embodiment under consideration, the second joint 52 is designed as a rotary joint or rotary bearing, which allows rotation of the sensor 28 about a second axis, which is aligned orthogonally with respect to the first axis.

With the aid of the fixing device 48, the two joints 50, 52 can be mechanically clamped. Among the components of the fixing device 48 is a third component 54, which is coupled to the first two components 42, 44 of the change interface 46 via a coupling mechanism 56. In the exemplary embodiment under consideration, said coupling mechanism 56 comprises a plate-shaped holder, which is preferably connected in a fixed manner to the second component 44, and a spring-loaded pin 60, 62, which is connected to the holder and via which the three components 42, 44, 54 are coupled to one another. The spring-loaded pin includes not only the pin 60 and the spring 62 arranged around the latter but also a supporting washer 64 and an adjusting nut 66. The supporting washer 64 serves to support the coupling mechanism 56 on the third component 54. The adjusting nut 66 is used to adjust the preload of the spring 62. The spring 62 is arranged clamped between the supporting washer 64 and the second joint or rotary bearing 52. The second joint or rotary bearing 52, in contrast, is arranged clamped between the spring 62 and the adjusting nut 66.

The functioning of the sensor adjustment mechanism 30 is explained below with reference to FIGS. 4 and 5.

FIG. 4 shows the first position of the sensor adjustment mechanism 30, in which the fixing device 48 releases the rotatability or pivotability of the sensor 28. The sensor adjustment mechanism 30 adopts this position when it is "merely" coupled to the measuring head 26 but not yet fixed to the latter.

FIG. 5, in contrast, shows the second position of the sensor adjustment mechanism 30, in which the fixing device 48 blocks the rotatability or pivotability of the sensor 28. The sensor adjustment mechanism 30 is in this position when it is fixed on the measuring head 26.

As long as the sensor adjustment mechanism 30 is merely coupled to the measuring head 26 but not yet fixed, the first component 42 rests by means of its supports 68 on corresponding bearings 70, which are arranged on the underside of the measuring head 26, as shown in FIG. 4. In this position, there is an air gap between the second component 44 and the second magnet 38. The second component 44 therefore does not touch the measuring head 26 in the first position of the sensor adjustment mechanism 30. The permanent magnet, which is preferably integrated into the second magnet 38, therefore exerts a relatively small force on the second component 44. However, it should be noted that the air gap described is shown in an exaggerated way in FIG. 4. In practice, it is usually of somewhat smaller dimensions. There is a further air gap between the first component 42 and the third component 54 in the first position, shown in FIG. 4, of the sensor adjustment mechanism 30. This air gap is formed because the spring 62 presses the first component 42 against the measuring head 26 or the bearings 70 of the measuring head 26 via the supporting washer 64. At the same time, the third component 54 is pulled downward by the force of gravity and is held by the second joint or rotary bearing 52, with support from the adjusting nut 66. The rotary bearing 52, which allows rotation of the third component 54 relative to the first component 42, is thus released. The release of the first joint 50 is likewise accomplished by means of an air gap, which exists around the shaft of the first joint 50, since the hole in which the shaft is arranged has slightly larger dimensions than the shaft itself.

If the sensor adjustment mechanism 30 is fixed on the measuring head 26 by activation of the electromagnet, which is preferably integrated into the second magnet 38, the situation shown in FIG. 5 is obtained. In this second position, the sensor adjustment mechanism 30 is not only fixed on the measuring head 26. At the same time, the two joints 50, 52 are also mechanically locked.

The locking of the first joint 50 is accomplished by deformation of the third component 54. As can be seen especially by comparing FIGS. 4 and 5, the deformation of the third component 54 comprises pivoting the two flanks 72, 74 of the third component 54. During this process, the first joint 50 is clamped firmly between the two flanks 72, 74.

The locking of the second joint 52 is due to frictional engagement, which results from the contact between the first component 42 and the third component 54.

The activation of the electromagnet integrated into the second magnet 38 brings about a movement of the second component 44 relative to the first component 42. During this process, the second component 44 is pulled upward relative to the first component 42 in the direction of the second magnet 38, together with the holder 58 and the pin 60. At the same time, the second magnet 38 moves downward toward the second component 44. The above-described air gap visible in FIG. 4 between the second magnet 38 and the second component 44 is thereby closed. The permanent magnet, which is integrated into the second magnet 38, therefore now exerts a relatively large force on the second component 44 since there is now no air gap. The electromagnet can then be deactivated again. Through the movement of the second component 44, the spring 62 is overcompressed, the third component 54 is pressed against the first component 42 from below, and the lower flank 74 is moved toward the upper flank 72. The two joints 50, 52 are thereby locked in the manner described above.

In one embodiment, provision can be made for an encircling V-groove to be formed in the first component 42 instead of the friction surfaces between the first component 42 and the third component 54. This serves to make the position and location of the rotating/pivoting device reproducible. Two balls of a three-point support can run in the V-groove described, while the third moves on a flat surface.

The clamping axis can be made reproducible by providing the shaft of the first joint 50 and the counterpart with a fine thread like that on a micrometer screw, for example. As a side effect, this also enhances the clamping effect since the V shape of the thread provides better nonpositive engagement than a smooth shaft.

The sensor adjustment mechanism 30 thus proves advantageous inasmuch as the fixing force generated by the second magnet 38, which is required in any case to fix the sensor adjustment mechanism 30 on the measuring head 26, is simultaneously also used to actuate the fixing device 48. Unlike the case with the sensor adjustment mechanisms hitherto known from the prior art, there is therefore no need for an additional device or separate control of the fixing device. The sensor 28 can thus be reoriented relatively quickly and simply during the measurement sequence.

FIGS. 6A-6F illustrate schematically a procedure in which the tactile sensor 28 (stylus) is reoriented. Since the sensor adjustment mechanism 30 is preferably a passive sensor adjustment mechanism, this repositioning or reorientation process takes place with the aid of an additional device 76, which is arranged in the measurement space of the coordinate measuring machine 10. At its upper end, this device 76 preferably comprises a roller triplet 78, which can be probed in a self-centering manner by the probe ball 29. In order to reposition or reorient the stylus 28, the fixing of the sensor adjustment mechanism 30 with the aid of the second magnet 38 is first of all released, thereby releasing the fixing device 48 and hence also the joints 50, 52. By virtue of the force of gravity, the stylus 28 then hangs vertically downward (see FIG. 6A). The roller triplet 78 is then probed by means of the probe ball 29 (see FIG. 6B). After this, the measuring head 26 is then moved into a new position (see FIG. 6C). By way of example, the stylus 28 is moved into the horizontal position by a self-centering circular movement of the machine in the XZ plane around the device 76 (see FIG. 6D). The desired angle of the second joint 52 of the stylus 28 is then set by a self-centering circular movement of the machine in the XY plane (see FIG. 6E). After this, the desired angle of the first joint 50 of the stylus 28 is set by a self-centering circular movement of the machine in a plane which moves only the first joint 50 (see FIG. 6F). As soon as this has been done, the second magnet 38 is reactivated, thereby fixing the sensor adjustment mechanism 30 on the measuring head 26 and, at the same time, locking the joints 50, 52 again.

It is self-evident that the procedure shown in FIGS. 6A-6F is only an illustrative procedure designed to illustrate the reorientation of the sensor 28. Of course, the sensor 28 can be pivoted through other angles or in a different sequence in the manner described above by means of further self-centering circular movements. At the end of the reorientation of the sensor 28, a measuring force is preferably applied in the negative Z direction, thereby enabling the exact position of the probe ball 29 in the three-point support of the device 76 to be determined. The probe ball 29 is thereby re-calibrated. The now reoriented and re-calibrated sensor 28 can then move out of the device 76 and can once again probe the workpiece 31 at additional desired measuring points.

Figure 7:
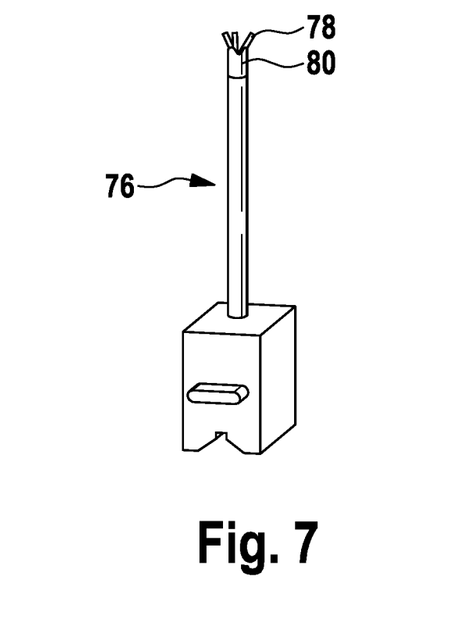
FIG. 7 shows a first exemplary embodiment of a repositioning device for repositioning a stylus.
Figure 8:
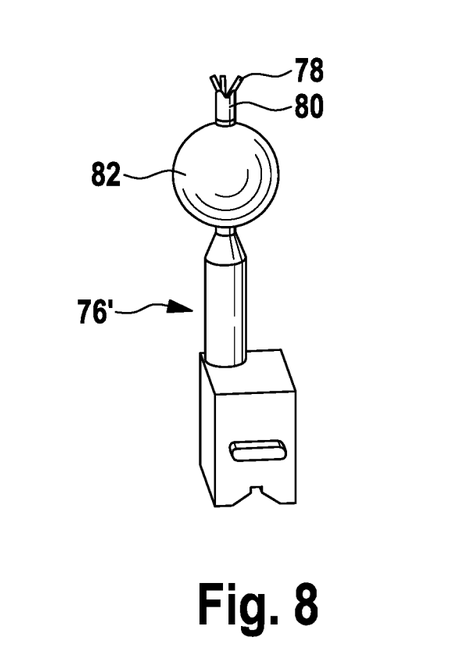
FIG. 8 shows a second exemplary embodiment of a repositioning device for repositioning a stylus.

FIGS. 7 and 8 show two examples of the repositioning device 76 in detail. The repositioning device 76 shown in FIG. 7 comprises a roller triplet 78, which is arranged on a rotary bearing 80, with the result that the center of a probe ball 29 always moves around the axis of rotation. This device 76 makes it possible both to reposition the axes and to determine the exact location of the probe ball 29 once it has been calibrated. The arrangement of the rollers and the associated holder allows probe balls in various sizes and angular positions over a wide range.

FIG. 8 shows a second exemplary embodiment of a repositioning device 76'. In addition to the roller triplet 78, this repositioning device 76' has a calibrating ball 82. Through the axial offset of the rotation/pivoting axes of the sensor adjustment mechanism 30, this ensures the possibility of automatic determination of the current position of the axis of rotation of the second joint 52. In the unclamped state of the sensor adjustment mechanism 30, the stylus 28 always hangs vertically downward, i.e. the location of the pivoting axis of the first joint 50 is determined. If, after the inward transfer of the sensor adjustment mechanism 30 from the magazine, the two axes of the joints 50, 52 are clamped and a flat surface is probed, the length of the stylus 28 is known. If the probe head 29 is then moved precisely over the repositioning device 76' and the calibrating ball 82 is probed vertically downward in the Z direction, it is possible to infer the angle of the axis of rotation of the second joint 52 from the measuring force that is now acting since the probe ball is always deflected in the direction of the axis of rotation. With this information and the distance between the two axes of the joints 50, 52, self-centering probing in the roller triplet 78 is now possible. Once this has been performed, both the location of the probe ball 29 and the diameter thereof are known since, owing to the geometry of the roller triplet 78, smaller balls penetrate more deeply than larger ones and the total length of the stylus 29 has already been determined by probing on the flat surface.

As already mentioned, the sensor adjustment mechanism 30 is always in the unclamped state in the magazine, and therefore the stylus 28 hangs down. This saves a very large amount of space in the region of the magazine since the probes do not protrude laterally but only hang down.

It is self-evident that the sensor adjustment mechanism can be used not only with tactile sensors but also with optical sensors. Of course, tactile sensors with more than just one probe ball can also be used. If, for example, a stylus 28 having a plurality of probe balls arranged on different stylus axes arranged transversely to one another is used, it is possible, by reorienting one stylus axis, to infer the location of the other stylus axes.

What is claimed is:

1. A sensor adjustment mechanism for a coordinate measuring machine, the sensor adjustment mechanism comprising:
    a sensor;
    a first joint that is designed as a pivot joint by means of which the sensor is pivotable about a first axis;
    a second joint that is designed as a rotary joint by means of which the sensor is rotatable about a second axis different from the first axis;
    a change interface for releasably coupling the sensor adjustment mechanism to a measuring head of the coordinate measuring machine; and
    a fixing device that is configured to clamp the first joint and the second joint,
    wherein the change interface comprises a first component and a ferromagnetic second component,
    wherein the second component is movably mounted so as to be movable relative to the first component,
    wherein the change interface is configured to be fixed to the measuring head of the coordinate measuring machine by means of a magnetic fixing force exerted on the second component, wherein the magnetic fixing force exerted on the second component causes a movement of the second component relative to the first component, and wherein the movement actuates the fixing device so as to clamp the first joint and the second joint and inhibit the sensor from being pivotable about the first axis and from being rotatable about the second axis.

2. The sensor adjustment mechanism as claimed in claim 1, wherein:
the fixing device comprises a third component, and
the third component is connected to the second component via a coupling mechanism and is deformed by the movement of the second component.

3. The sensor adjustment mechanism as claimed in claim 2, wherein the sensor is connected to the third component via the first joint.

4. The sensor adjustment mechanism as claimed in claim 3, wherein:
the third component comprises two flanks,
the first joint is arranged between the two flanks, and
the first joint is clamped in between the two flanks when the third component is deformed by the movement of the second component.

5. The sensor adjustment mechanism as claimed in claim 2, wherein:
the second joint is connected to the third component via the coupling mechanism and
the second joint is clamped when the third component is deformed by the movement of the second component.

6. The sensor adjustment mechanism as claimed in claim 2, wherein the first component, the second component, and the third component are connected to one another by the coupling mechanism.

7. The sensor adjustment mechanism as claimed in claim 2, wherein the coupling mechanism comprises a spring-loaded pin.

8. The sensor adjustment mechanism as claimed in claim 1, wherein the first component at least partially surrounds the second component.

9. The sensor adjustment mechanism as claimed in claim 1, wherein the first component comprises a plate-shaped or circular-ring-shaped disk and at least three supports, which are arranged on the plate-shaped or circular-ring-shaped disk.

10. The sensor adjustment mechanism as claimed in claim 1, wherein the sensor comprises a stylus and/or an optical sensor.

11. A coordinate measuring machine for determining spatial coordinates on a measurement object, the coordinate measuring machine comprising:
a measuring head;
a frame structure that is configured to move the measuring head relative to the measurement object; and
a sensor adjustment mechanism,
wherein the sensor adjustment mechanism comprises:
a sensor;
a first joint that is designed as a pivot joint by means of which the sensor is pivotable about a first axis;
a second joint that is designed as a rotary joint by means of which the sensor is rotatable about a second axis different from the first axis;
a change interface for releasably coupling the sensor adjustment mechanism to the measuring head; and
a fixing device that is configured to clamp the first joint and the second joint,
wherein the change interface comprises a first component and a ferromagnetic second component, wherein the second component is movably mounted so as to be movable relative to the first component,
wherein the change interface is configured to be fixed to the measuring head by means of a magnetic fixing force exerted on the second component,
wherein the magnetic fixing force exerted on the second component causes a movement of the second component relative to the first component, and
wherein the movement actuates the fixing device so as to clamp the first joint and the second joint and inhibit the sensor from being pivotable about the first axis and from being rotatable about the second axis.

12. The coordinate measuring machine as claimed in claim 11, wherein:
the measuring head comprises a first magnet that is configured to produce a magnetic coupling force for coupling the sensor adjustment mechanism to the measuring head,
the measuring head comprises a second magnet i-s-configured to produce the magnetic fixing force for fixing the sensor adjustment mechanism to the measuring head, and
the magnetic fixing force is greater than the magnetic coupling force.

13. The coordinate measuring machine as claimed in claim 12, wherein:
the first magnet is a permanent magnet, and
the second magnet comprises an electromagnet.

14. The coordinate measuring machine as claimed in claim 13, wherein:
the coordinate measuring machine further comprises a control device that is configured to control the second magnet, and
the control device is configured to activate the second magnet to actuate the fixing device and to deactivate the second magnet to release the fixing device.

15. A sensor adjustment mechanism for a coordinate measuring machine, comprising:
a sensor;
at least one joint by means of which the sensor is pivotable and/or rotatable;
a change interface for releasably coupling the sensor adjustment mechanism to a measuring head of the coordinate measuring machine; and
a fixing device that is configured to clamp the at least one joint,
wherein the change interface comprises a first component and a ferromagnetic second component,
wherein the second component is movably mounted so as to be movable relative to the first component,
wherein the fixing device comprises a third component,
wherein the third component is connected to the second component via a coupling mechanism,
wherein the change interface is configured to be fixed to the measuring head of the coordinate measuring machine by means of a magnetic fixing force exerted on the second component,
wherein the magnetic fixing force exerted on the second component causes a movement of the second component relative to the first component, and
wherein the movement deforms the third component and thereby actuates the fixing device so as to clamp the at least one joint and inhibit the sensor from being pivotable and/or rotatable.

16. A coordinate measuring machine for determining spatial coordinates on a measurement object, the coordinate measuring machine comprising:

a measuring head;
a frame structure that is configured to move the measuring head relative to the measurement object; and
a sensor adjustment mechanism,
wherein the sensor adjustment mechanism comprises:
  a sensor;
  at least one joint by means of which the sensor is pivotable and/or rotatable;
  a change interface for releasably coupling the sensor adjustment mechanism to the measuring head; and
  a fixing device that is configured to clamp the at least one joint,
wherein the change interface comprises a first component and a ferromagnetic second component,
wherein the second component is movably mounted so as to be movable relative to the first component,
wherein the fixing device comprises a third component,
wherein the third component is connected to the second component via a coupling mechanism,
wherein the change interface is configured to be fixed to the measuring head by means of a magnetic fixing force exerted on the second component,
wherein the magnetic fixing force exerted on the second component causes a movement of the second component relative to the first component, and
wherein the movement deforms the third component and thereby actuates the fixing device so as to clamp the at least one joint and inhibit the sensor from being pivotable and/or rotatable.

* * * * *

UNITED STATES PATENT AND TRADEMARK OFFICE
CERTIFICATE OF CORRECTION

PATENT NO. : 10,788,303 B2
APPLICATION NO. : 16/017070
DATED : September 29, 2020
INVENTOR(S) : Otto Ruck It is certified that error appears in the above-identified patent and that said Letters Patent is hereby corrected as shown below:

In the Claims

Claim 12, Column 14, Line 19       after "magnet", delete "i-s-"

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*